United States Patent [19]

Van der Hardt Aberson

[11] 4,274,520

[45] Jun. 23, 1981

[54] TRANSMISSION HAVING VARIABLE V-BELT UNIT AND HYDRODYNAMIC UNIT

[75] Inventor: Frederik E. C. Van der Hardt Aberson, Eindhoven, Netherlands

[73] Assignee: Van Doorne's Transmissie B.V., Tilburg, Netherlands

[21] Appl. No.: 58,111

[22] Filed: Jul. 16, 1979

[30] Foreign Application Priority Data

Jul. 14, 1978 [NL] Netherlands .................... 7807579

[51] Int. Cl.$^3$ ................ B60K 41/02; F16H 55/52
[52] U.S. Cl. ........................... 192/3.32; 192/3.57; 74/730; 474/28
[58] Field of Search ............ 74/730, 732, 217 CU, 74/230.16, 230.17 A, 230.17 F; 192/3.51, 3.54, 3.57, 3.3, 3.32, 3.33, 3.29; 474/28

[56] References Cited

U.S. PATENT DOCUMENTS

| 1,068,364 | 7/1913 | Pugh et al. ............... 74/217 CU X |
| 2,467,249 | 4/1949 | Bobard ........................ 192/3.57 X |
| 2,829,533 | 4/1958 | Ballmer et al. ............ 192/3.54 X |
| 3,083,801 | 4/1963 | Frohner ......................... 192/3.57 |
| 3,365,035 | 1/1968 | Kress ........................ 192/3.57 X |
| 3,526,305 | 9/1970 | August ............................. 74/732 X |
| 3,893,343 | 7/1975 | Zaiser et al. ............. 74/217 CU X |
| 4,125,037 | 11/1978 | Palmer et al. ......... 74/230.17 A X |
| 4,143,558 | 3/1979 | Van Deursen et al. ...... 74/230.17 F |

FOREIGN PATENT DOCUMENTS

| 607558 | 10/1960 | Canada ....................... 74/230.17 A |
| 2744627 | 4/1978 | Fed. Rep. of Germany ... 74/230.17 A |

Primary Examiner—George H. Krizmanich
Attorney, Agent, or Firm—Cushman, Darby & Cushman

[57] ABSTRACT

A transmission includes a hydrodynamic transmission, such as a torque convertor or a fluid coupling, connectable to a drive source and driving an infinitely variable V-belt transmission having primary and secondary pulleys each constructed of two conical pulley discs. The drive ratio of the V-belt transmission is controlled by a pressure cylinder which adjusts the axial position of one of the pulley discs, and the hydrodynamic transmission is lockable in a direct drive mode in response to the pressure in the pressure cylinder.

3 Claims, 1 Drawing Figure

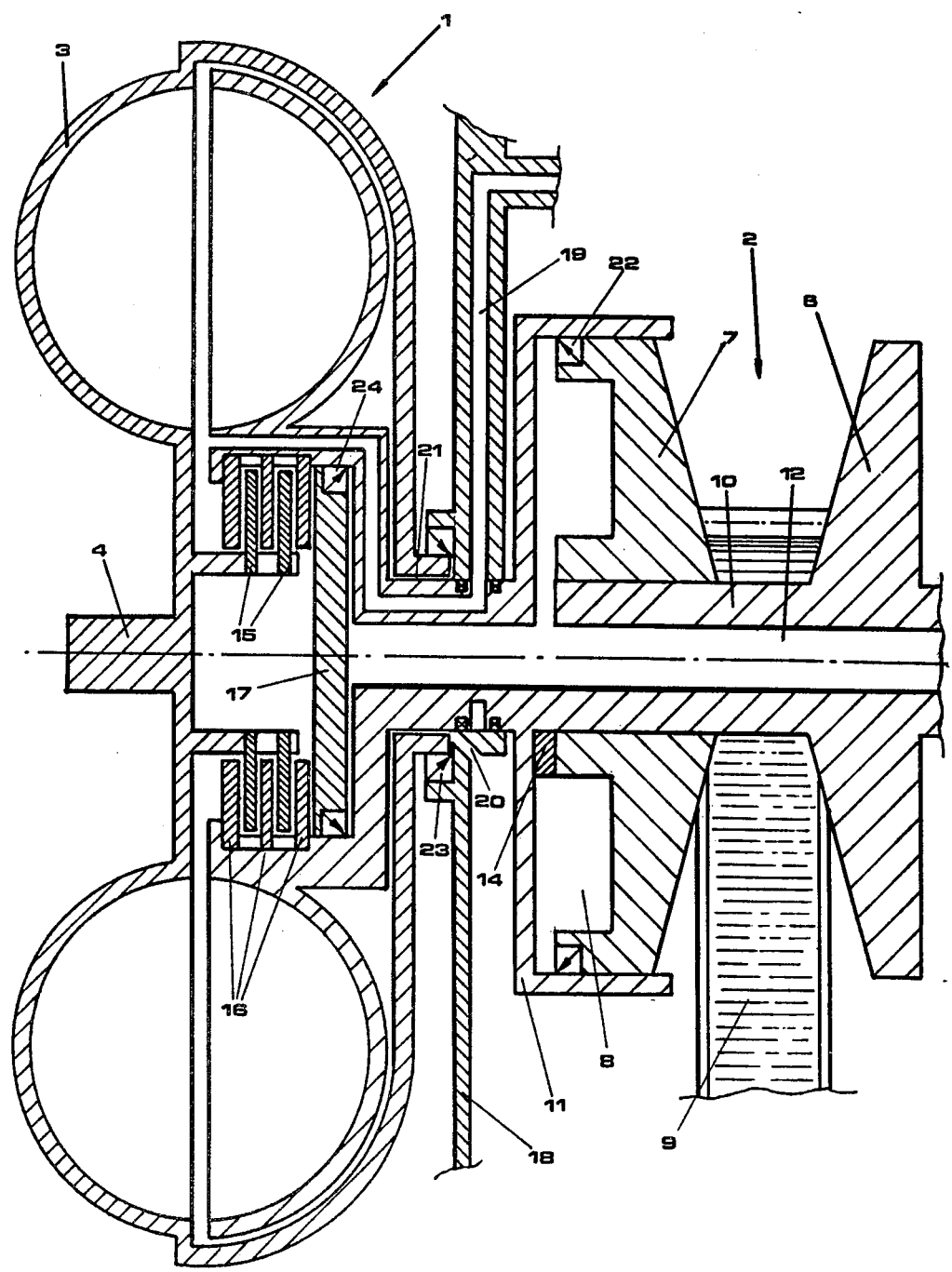

TRANSMISSION HAVING VARIABLE V-BELT UNIT AND HYDRODYNAMIC UNIT

This invention relates to a transmission, in particular for a motor vehicle, which includes an infinitely variable V-belt transmission unit and a hydrodynamic transmission unit, such as a torque converter or a fluid coupling, drivingly connected together.

BACKGROUND OF THE INVENTION

German Pat. No. 1630298 discloses a transmission of the general kind to which the present invention relates. The infinitely variable V-belt transmission, which is drivingly connected to the output of the hydrodynamic transmission unit, includes as is conventional a primary pulley and a secondary pulley. Each pulley is constructed of a pair of conical discs, and at least one disc of each pair is axially movable toward and away from the other disc of that pair. A primary fluid pressure cylinder controls the spacing between the discs of the primary pulley, and a secondary fluid pressure cylinder controls the spacing between the discs of the secondary pulley. The hydrodynamic transmission unit, in the system disclosed in the German patent is a torque converter, i.e. a transmission unit which on the one end serves as take-off clutch for driving away and on the other end for increasing the engine torque at low vehicle speeds, so that the range of ratios of the transmission can be increased. The hydrodynamic transmission unit, however, may also consist of a so-called fluid coupling, by which the engine torque is not increased and which only serves as take-off clutch. A general drawback of a hydrodynamic transmission unit is the continuous presence of a speed difference between the input and the output shaft, i.e. slip, which results in a loss of power. In order to eliminate this drawback, it is known to provide the hydrodynamic transmission unit with means for locking said transmission unit in a direct drive mode. The lock-up, for example in the form of a plate clutch, effects a direct, mechanical connection between the input and the output shift of the hydrodynamic transmission unit.

A drawback of the transmission lock-up feature is the complexity of its control, i.e. the regulation of the locking of the clutch in a direct drive mode during the periods in which the hydrodynamic transmission unit is not used for take off or for torque increase. For example, when the clutch is hydraulically operated a special operating valve is required.

SUMMARY OF THE INVENTION

It is the principal object of the invention to provide a simplified control for a hydrodynamic transmission lock-up. This is accomplished, according to the invention, by a control means which is operable in response to fluid pressure in the primary operating cylinder of the V-belt transmission unit. In the preferred embodiment the fluid pressure in the primary operating cylinder acts on a piston which causes engagement of the lock-up clutch. This enables control, through the same fluid supply valve, of both the transmission ratio of the variable V-belt transmission unit and the engagement and disengagement of the lock-up in the hydrodynamic transmission unit. As long as the variable V-belt transmission unit has the maximum transmission ratio, i.e. is in the lowest gear, the driving belt runs in the primary pulley with minimal running diameter, whereby the conical discs have their maximum interspace and are pushed against stops by the tensile stress in the V-belt. At pressure values up to that at which the V-belt transmission unit is caused to shift toward a lower ratio, the fluid pressure in the primary cylinder may be varied without affecting the V-belt unit, and in this pressure range the fluid pressure variation may be used for operating the lock-up. As long as the variable V-belt transmission is in a higher gear, there is always sufficient fluid pressure in the primary cylinder to keep the lock-up closed, i.e. to keep the hydrodynamic transmission unit in a direct drive mode. By thus using the fluid pressure in the primary operating cylinder for operating the locking of the hydrodynamic transmission unit, there is achieved a simple construction, whereby either (1) a torque convertor or a fluid coupling functions in its normal manner (i.e. transmits power hydrodynamically) and the variable transmission is in the lowest gear, or (2) the torque converter or the fluid coupling is locked in direct drive and the variable transmission unit influences the transmission ratio of the overall transmission. The same fluid supply and discharge valve may thereby control the transmission ratio of the V-belt unit as well as operate the lock-up.

In a preferred embodiment the lock-up comprises a clutch, such as a wet plate clutch, the plates of which are engaged by means of a hydraulic pressure cylinder, and conduit means is provided for placing the primary operating cylinder in fluid communication with the pressure cylinder of the clutch. The conduit means may include valve means, such as a pressure reducing valve.

The mechanical locking of the hydrodynamic transmission unit may furthermore comprise a vibration damper in order to counteract the transmission of torsional vibrations.

The sole FIGURE is a cross-section of a transmission embodying the principle of the present invention.

DETAILED DESCRIPTION

One embodiment of the transmission according to the invention will now be described, by way of example, with reference to the accompanying drawing which is a schematic sectional view of a transmission embodying the principles of the invention. The drawing diagrammatically shows a part of the transmission, viz. a fluid coupling 1 and a primary pulley 2 of a two-pulley, infinitely variable ratio V-belt transmission unit. The fluid coupling 1 comprises a pump impeller 3 which via an input shaft 4 is driven by an engine, not shown, and a turbine impeller, which is directly connected to the primary pulley 2 of the variable V-belt transmission unit. Only the primary pulley 2, and a part of V-belt 9 are shown. The primary pulley 2 comprises a conical disc 6 fixedly connected to a primary shaft 10, and a conical disc 7 axially movable over the primary shaft 10. The running diameter of the V-belt 9 in the primary pulley 2 is defined by the interspace of the discs 6 and 7. With the maximum interspace shown in the drawing, the V-belt 9 lines with a minimum running diameter in the pulley 2. Through the tensile stress in the V-belt 9 the side half 7 is urged against a stop 14 connected to the primary shaft 10. Disc 7 functions as a piston in a fluid pressure operating cylinder 11, which is fixedly connected to the primary shaft 10 and by which a cylinder space 8 is enclosed. By pressure fluid supply and discharge to and from the cylinder space 8, via a coaxial fluid conduit 12 in the primary shaft 10, the spacing between the discs 6, 7 may be varied, resulting in a change of the running diameter of the V-belt 9 in the primary pulley 2. Thereby an equilibrium may be adjusted between the fluid pressure in the cylinder space 8 and the tensile stress in the V-belt 9. Such a control is described in detail in Dutch patent application No. 7601286.

The transmission ratio of the variable V-belt transmission is consequently adjusted by fluid supply and discharge to and from the cylinder space 8, while the fluid pressure should always be sufficiently large to achieve an equilibrium condition with the tensile stress in the V-belt.

In the illustrated embodiment there is a plate clutch having plates 15 carried by the input shaft 4 and plates 16 carried by the primary shaft 10. A clutch-actuating piston 17 is exposed to the fluid pressure in the conduit 12, so that at a predetermined pressure in the conduit the piston 17 presses the plates 15 and 16 against each other, to effect a direct, mechanical connection between the shafts 4 and 10. Thus the hydrodynamic transmission unit 1 can be locked in a direct drive mode depending on the fluid pressure prevailing in the cylinder space 8. By means of the construction shown in the drawing, it is possible, depending on the fluid pressure in conduit 12 (and cylinder space 8), to operate the direct-drive lock-up 15, 16, 17, and to adjust the transmission ratio of the V-belt transmission. Thereby lock-up takes place at a fluid pressure that is insufficient to displace the disc 7 against the tensile stress of V-belt 9 and away from stop 14, while during displacement of the disc 7 such a large fluid pressure is always pesent that the direct-drive lock-up remains in effect.

The drawing furthermore shows a part of a stationary wall 18 which separates the coupling unit of the transmission from the V-belt transmission. In the wall 18 there is accommodated a fluid conduit 19 for supplying fluid to the hydrodynamic fluid coupling 1. Moreover, a bore 20 is disposed for discharging fluid leaking via bearing 21. The fluid pressure prevailing in the fluid coupling 1 ensures the release of the plate clutch 15, 16, 17, when the fluid pressure in the space 8 is insufficient to engage the clutch, so that no additional provisions are required for clutch release.

The transmission is provided with seals 22, 23 and 24 for counter-acting fluid leakage in the respective places. Furthermore, restrictions may be optionally applied in the fluid lines which are not shown in the drawing. The drawing only shows a diagrammatic picture of one embodiment; it will be clear that modifications of the illustrated combination of the direct-drive lock-up and the V-belt transmission are possible within the scope of the invention.

What is claimed is:
1. A transmission comprising a hydrodynamic transmission unit having an output drivingly connected to the input of a variable ratio V-belt transmission unit, the hydrodynamic transmission unit including a lock-up means operative to lock the hydrodynamic transmission unit in a direct-drive mode and the variable ratio V-belt transmission unit having a fluid pressure cylinder which controls the axial position of a conical pulley disc forming part of the V-belt transmission unit to thereby control the ratio of the V-belt transmission unit, and control means responsive to the fluid pressure in said fluid pressure cylinder for actuating said direct-drive lock-up means.

2. A transmission as in claim 1 wherein said direct-drive lock-up means includes a clutch and a fluid pressure cylinder for engaging the clutch and wherein the fluid pressure cylinder of said clutch is in communication with the fluid pressure cylinder of said V-belt transmission unit.

3. A transmission comprising: a hydrodynamic transmission unit having an output drivingly connected to the input of a variable ratio V-belt transmission unit; engageable and disengageable lock-up means forming part of said hydrodynamic transmission unit and operative when engaged to lock said hydrodynamic transmission unit in a mechanical direct-drive mode and operative when disengaged to permit transmission of power hydrodynamically, said lock-up means including a movable locking element, a first fluid pressure cylinder for moving said member to a locking position when pressurized to a first predetermined pressure; the variable ratio V-belt transmission unit having a primary pulley constructed of two conical discs at least one of which is axially movable toward and away from the other, said V-belt transmission unit having a second fluid pressure cylinder which when pressurized to a second predetermined pressure higher than said first predetermined pressure moves one of said conical pulley discs axially toward the other to thereby reduce the ratio of the V-belt transmission unit; conduit means placing said first and second fluid pressure cylinders in fluid communication with each other and means for supplying and discharging fluid pressure to and from said chambers and conduit whereby when the fluid pressure is such that the V-belt transmission unit is run at high ratio the hydrodynamic transmission unit transmits power in a hydrodynamic mode and whereby when the fluid pressure is such that the V-belt transmission is run at low ratio the hydrodynamic transmission unit transmits power in a direct-drive mode.

* * * * *